United States Patent
Ahmed (10) Patent No.: US 11,060,662 B2
(45) Date of Patent: Jul. 13, 2021

(54) RIGGING ASSEMBLIES AND SYSTEMS

(71) Applicant: CommScope Technologies LLC, Hickory, NC (US)

(72) Inventor: Firoz Ahmed, Houston, TX (US)

(73) Assignee: CommScope Technologies LLC, Hickory, NC (US)

(*) Notice: Subject to any disclaimer, the term of this patent is extended or adjusted under 35 U.S.C. 154(b) by 5 days.

(21) Appl. No.: 16/592,442

(22) Filed: Oct. 3, 2019

(65) Prior Publication Data

US 2020/0116300 A1 Apr. 16, 2020

Related U.S. Application Data

(60) Provisional application No. 62/744,283, filed on Oct. 11, 2018.

(51) Int. Cl.
*F21V 35/00* (2006.01)
*F16M 13/02* (2006.01)
*A62B 35/00* (2006.01)

(52) U.S. Cl.
CPC ....... *F16M 13/022* (2013.01); *A62B 35/0068* (2013.01)

(58) Field of Classification Search
CPC ... A62B 35/0068; A62B 1/16; F16L 55/1015; F16L 37/002; F16L 23/06; F16L 23/04; F16L 37/20
See application file for complete search history.

(56) References Cited

U.S. PATENT DOCUMENTS

| | | | |
|---|---|---|---|
| 1,495,536 A | 5/1924 | Smith | |
| 3,722,038 A * | 3/1973 | Arntz | B23K 37/0533 29/281.1 |
| 3,790,950 A | 2/1974 | Smith et al. | |
| 4,129,393 A | 12/1978 | Sickler | |
| 4,677,805 A | 7/1987 | Schleisner | |
| 4,934,675 A * | 6/1990 | Klocke | B25B 1/205 269/111 |
| 5,228,258 A | 7/1993 | Onoda et al. | |

(Continued)

FOREIGN PATENT DOCUMENTS

CN 302982227 10/2014

OTHER PUBLICATIONS

Gen 2, Enhanced Load Frame, 12'-6" Face w/4 – 96" Pipes, Spec Sheet, posted at Talley.com, posting date not given, © 2017 Talley. com [online], [site visited Jan. 9, 2017], Available from Internet, URL: https://www.talleycom.com/images/pdf/MTSSFG.pdf.

(Continued)

*Primary Examiner* — Amy J. Sterling
(74) *Attorney, Agent, or Firm* — Myers Bigel, P.A.

(57) ABSTRACT

The present disclosure describes a rigging assembly, comprising a plurality of rig attachment members, each rig attachment member having a top, a bottom, and at least two side walls, wherein each of the at least two side walls comprise an aperture; a cable serially inserted through each of the apertures of the rig attachment members; and at least one tension member having one end coupled to the cable and having an opposite end secured to one of the rig attachment members, wherein the plurality of rig attachment members are held by the cable in tension exerted by the at least one tension member. A rigging and fall protection system are also described.

14 Claims, 10 Drawing Sheets

(56) References Cited

U.S. PATENT DOCUMENTS

| | | |
|---|---|---|
| 5,339,957 A | 8/1994 | Carstens |
| 5,920,291 A | 7/1999 | Bosley |
| 6,076,724 A * | 6/2000 | Collins, Jr. ........ B23K 37/0435 228/44.3 |
| 6,082,068 A | 7/2000 | Fisher |
| 6,145,269 A | 11/2000 | Fisher |
| 6,161,359 A | 12/2000 | Ono |
| D475,555 S | 6/2003 | Lauts |
| 7,113,145 B1 | 9/2006 | Noble |
| 7,466,286 B2 | 12/2008 | Chapman |
| 7,659,865 B2 | 2/2010 | Kreitzberg et al. |
| 7,963,084 B2 | 6/2011 | Merrifield et al. |
| 8,393,581 B2 | 3/2013 | Keller et al. |
| 8,746,641 B2 | 6/2014 | Fackler |
| 9,478,845 B2 | 10/2016 | Hemmervall et al. |
| 2003/0131539 A1 | 7/2003 | Burford et al. |
| 2007/0205957 A1 | 9/2007 | Chapman |
| 2007/0261355 A1 | 11/2007 | Carlisle et al. |
| 2008/0048928 A1 | 2/2008 | Michaelis |
| 2010/0269446 A1 | 10/2010 | Merrifield |
| 2011/0095956 A1 | 4/2011 | Conrad |
| 2013/0221182 A1 | 8/2013 | Renilson et al. |
| 2015/0101261 A1 | 4/2015 | Merrifield |
| 2016/0211569 A1 | 7/2016 | Skrepcinski et al. |
| 2016/0322697 A1 | 11/2016 | Skrepcinski et al. |
| 2018/0231075 A1 * | 8/2018 | Mahana ................ F16D 63/008 |

OTHER PUBLICATIONS

International Search Report and Written opinion for corresponding PCT Application No. PCT/US2016/029290, dated Jul. 27, 2016, 11 pages.

Notification Concerning Transmittal of International Preliminary Report on Patentability corresponding to International Application No. PCT/US2016/029290 dated Nov. 9, 2017.

* cited by examiner

RIGGING ASSEMBLIES AND SYSTEMS

RELATED APPLICATION

The present application claims priority from and the benefit of U.S. Provisional Patent Application 62/744,283, filed Oct. 11, 2018, the disclosure of which is hereby incorporated herein by reference in its entirety.

FIELD OF THE INVENTION

The present application is directed generally toward telecommunications equipment, and more particularly rigging assemblies and systems.

BACKGROUND OF THE INVENTION

Rigging assemblies can be used to support telecommunications equipment and/or technician to a mounting structure (e.g., a monopole antenna). Currently, rigging assemblies have multiple connection points where threaded bolts are used at each connection point. There may be a need for a rigging assembly for use in small cell telecommunication towers that utilize a single point connection and allow for easy, more efficient installation while reducing costs.

SUMMARY OF THE INVENTION

A first aspect of the present invention is directed to a rigging assembly, comprising: a plurality of rig attachment members, each rig attachment member having a top, a bottom, and at least two side walls, wherein each of the at least two side walls comprises an aperture; a cable serially inserted through each of the apertures of the rig attachment members; and at least one tension member having one end coupled to the cable and having an opposite end secured to one of the rig attachment members, wherein the plurality of rig attachment members are held by the cable in tension exerted by the at least one tension member.

Another aspect of the present invention is directed to a rigging system, comprising: a mounting structure; and a rigging assembly, the rigging assembly comprising: a plurality of rig attachment members surrounding the mounting structure, each rig attachment member having a top, a bottom, and at least two side walls, wherein the top and bottom of each rig attachment member are configured to support a rig point member and each of the at least two side walls comprise an aperture; a cable serially inserted through each of the apertures of the rig attachment members; and at least one tension member having one end coupled to the cable and having an opposite end secured to one of the rig attachment members, wherein the plurality of rig attachment members are held by the cable in tension exerted by the at least one tension member, thereby securing the rigging assembly to the mounting structure.

Another aspect of the present invention is directed to a fall protection system, comprising: a mounting structure; and a rigging assembly, the rigging assembly comprising: a plurality of rig attachment members surrounding the mounting structure, each rig attachment member having a top, a bottom, and at least two side walls, wherein the top and bottom of each rig attachment member are configured to support a rig point member and each of the at least two side walls comprise an aperture; a cable serially inserted through each of the apertures of the rig attachment members; at least one tension member having one end coupled to the cable and having an opposite end secured to one of the rig attachment members; a support cable secured to at least one of the rig point members and configured to support a load weight, wherein the plurality of rig attachment members are held by the cable in tension exerted by the at least one tension member, thereby securing the rigging assembly to the mounting structure.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention now will be described more fully hereinafter with reference to the accompanying drawings, in which illustrative embodiments of the invention are shown.

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Referring now to the figures, a rigging assembly 100 according to some embodiments of the present invention is illustrated in FIGS. 1-10. Referring to FIGS. 1-7, the rigging assembly 100 may comprise a plurality of rig attachment members 102. For example, in some embodiments, the rigging assembly 100 comprises three rig attachment members 102. In some embodiments, the rigging assembly 100 may comprise 2, 3, 4, or more rig attachment members 102.

Figure 1:
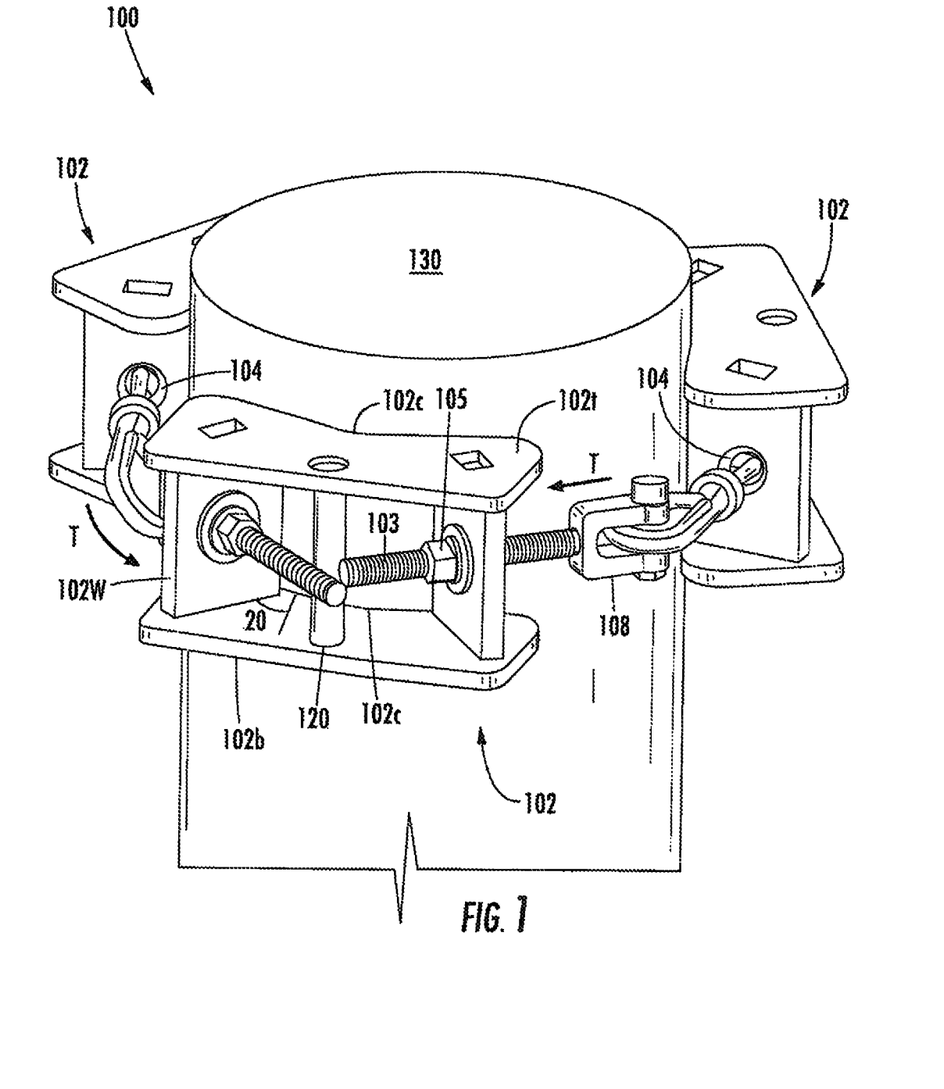
FIG. 1 is a top perspective view of a rigging assembly according to embodiments of the present invention.
Figure 2:
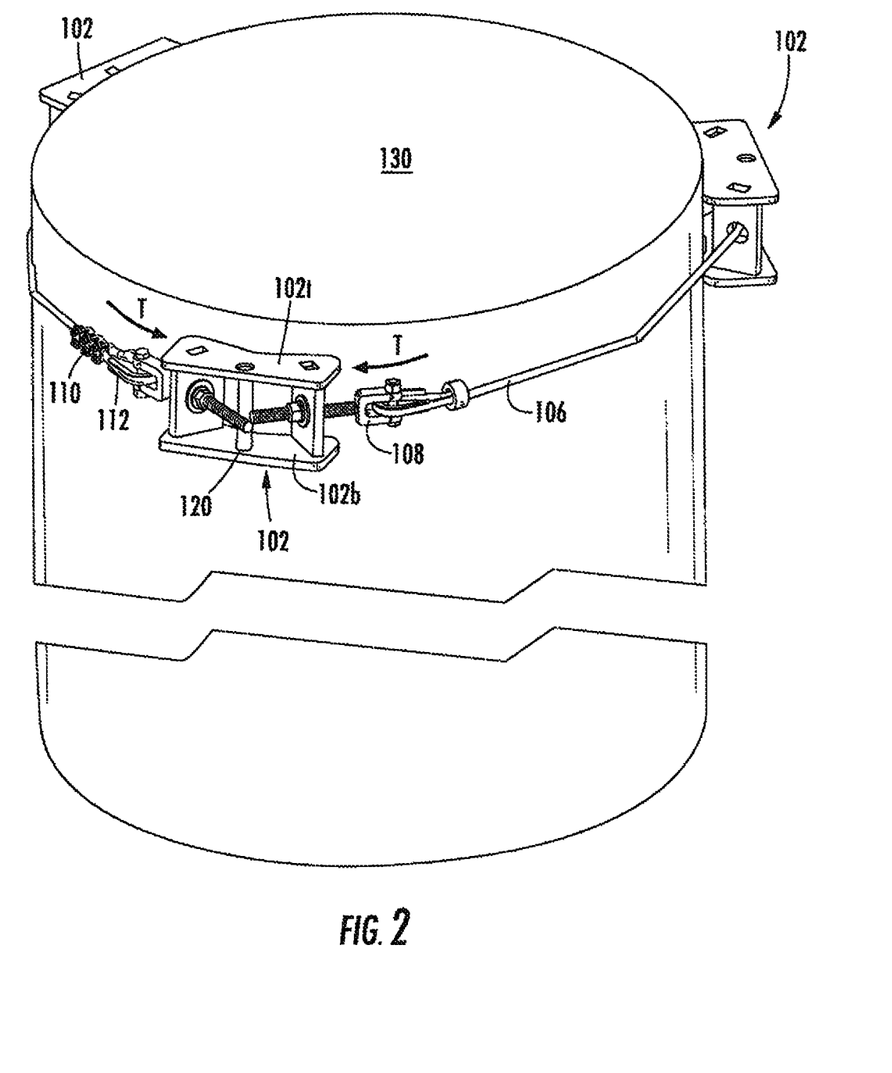
FIG. 2 is a top perspective view of the rigging assembly of FIG. 1.

As shown in FIGS. 1 and 2, each rig attachment member 102 has a top 102$t$, a bottom 102$b$ and at least two side walls 102$w$. The at least two side walls 102$w$ of the rig attachment members 102 may each comprise an aperture 104. In some embodiments, the apertures 104 are each sized and adapted to receive a cable 106. In some embodiments, the rig attachment members 102 may each be formed of a weldment. In some embodiments, the rig attachment members 102 may comprise galvanized steel.

Figure 4:
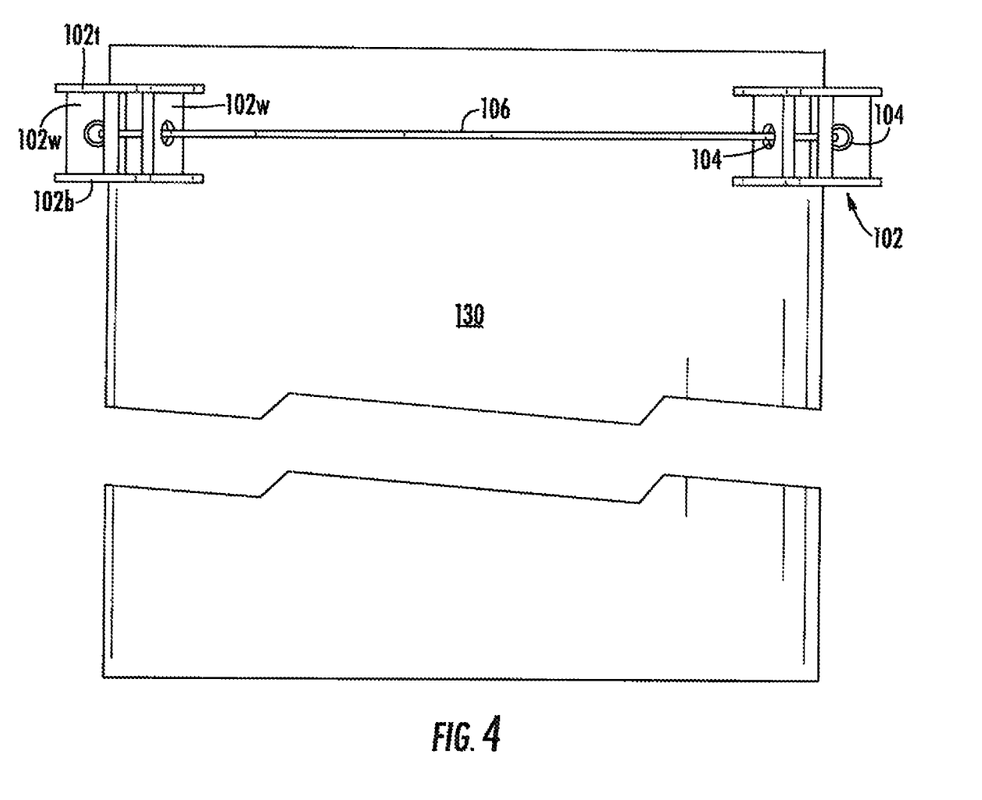
FIG. 4 is a side view of the rigging assembly of FIG. 1.
Figure 5:
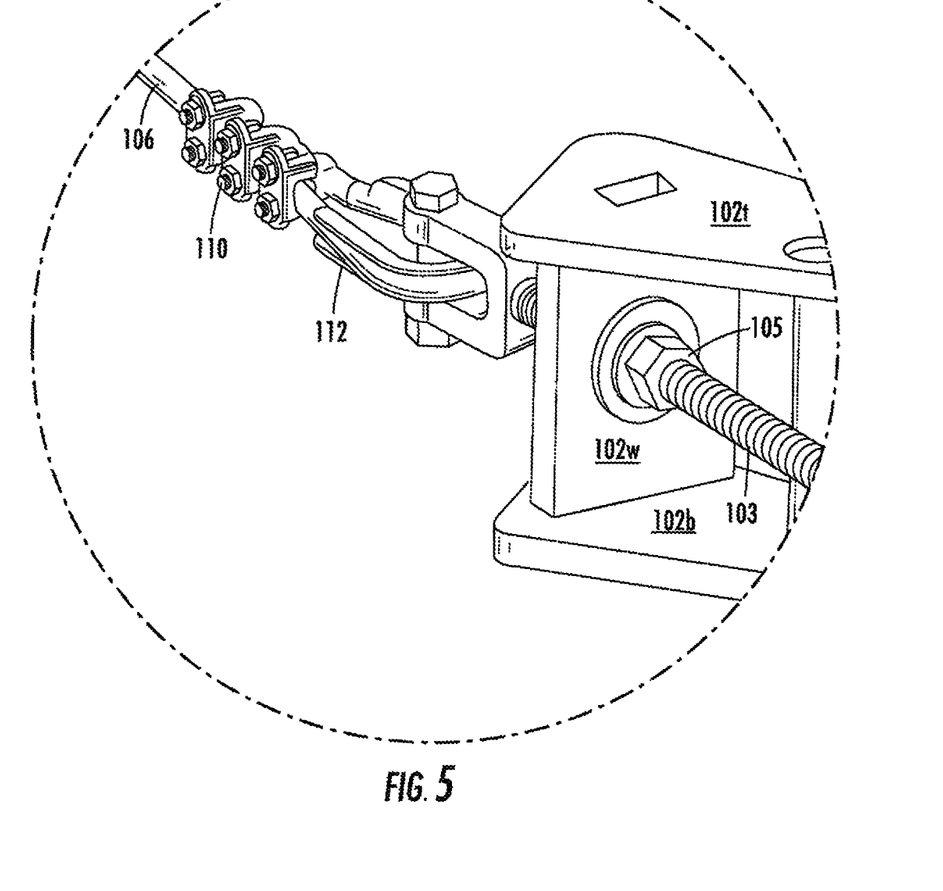
FIG. 5 is an enlarged perspective view of the turnbuckle jaw of the rigging assembly of FIG. 1.
Figure 6:
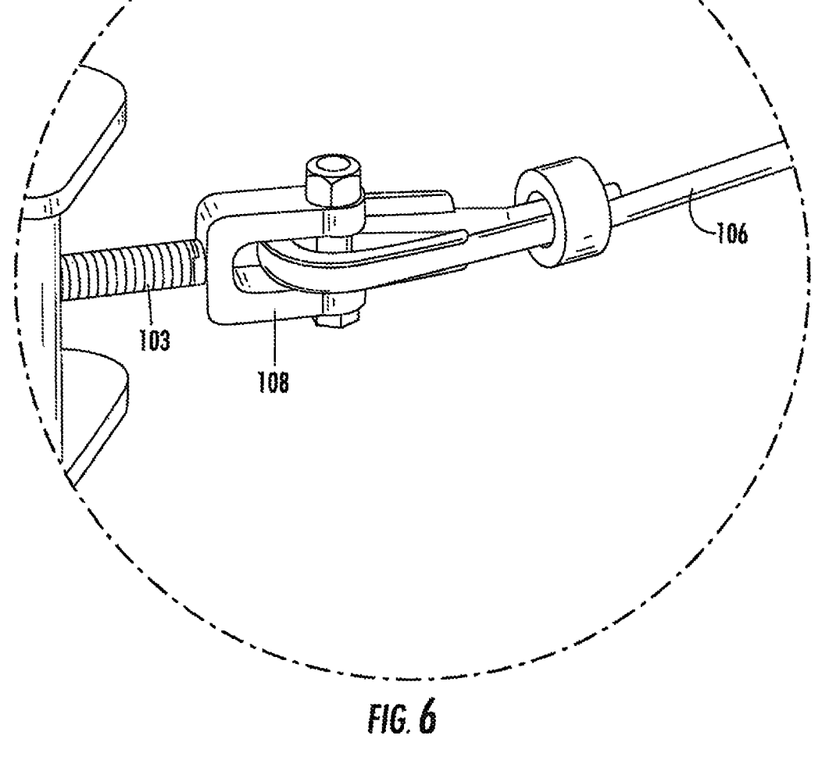
FIG. 6 is an enlarged perspective view of the open thimble of the rigging assembly of FIG. 1.
Figure 7:
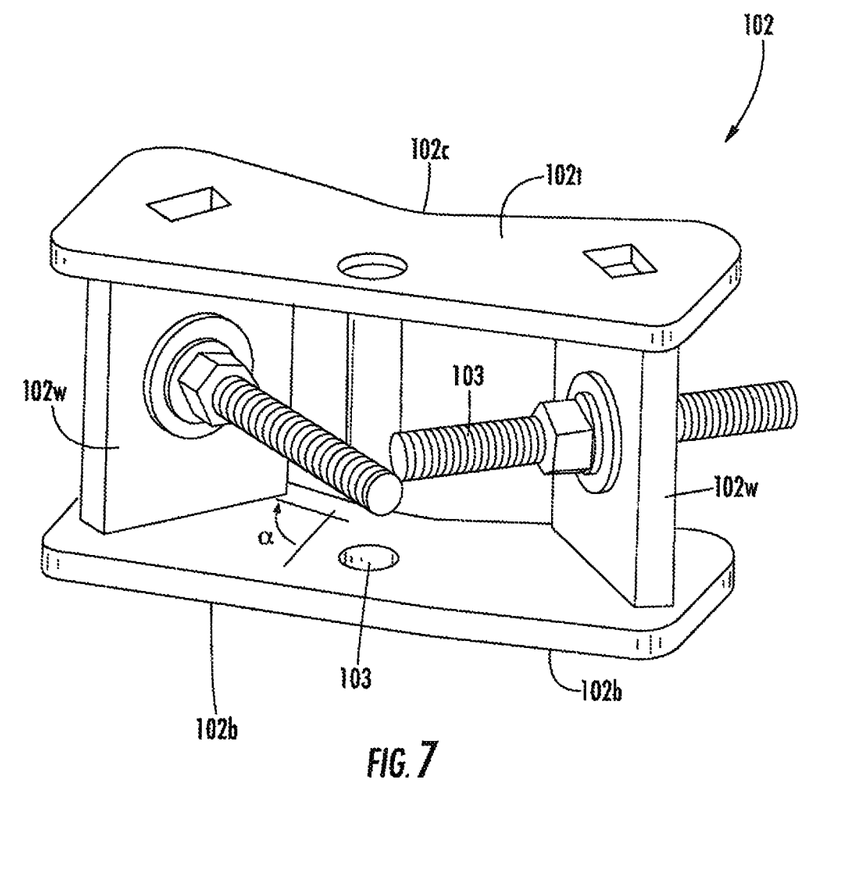
FIG. 7 is top perspective view of a rigging assembly according to embodiments of the present invention.

The rigging assembly 100 may comprise a cable 106 serially inserted through each of the apertures 104 in the sidewalls 102$w$ of each rig attachment member 102 (see, e.g., FIG. 4). In some embodiments, the apertures 104 have an internal diameter in the range of about 9 mm to about 11 mm. In some embodiments, the apertures 104 are sized and adapted to receive a cable 106 having diameter in the range of about 6 mm to about 10 mm. In some embodiments, the apertures 104 are adapted to receive a threaded bolt 103, i.e., the inner surface of the apertures 104 may be threaded.

The rigging assembly 100 may further comprise at least one tension member 108. In some embodiments, the at least one tension member 108 is a turnbuckle jaw. In some embodiments, one end of the tension member 108 is coupled to an end of the cable 106 and the opposite end of the tension member 108 is secured to a sidewall 102$w$ of one of the rig attachment members 102. Typically, the tension member 108 is received through an aperture 104 and secured to the sidewall 102$w$ of the rig attachment member 102. For example, in some embodiments, the tension member 108 comprises a threaded bolt 103 (e.g., when the tension member 108 is a turnbuckle jaw) that is screwed through the aperture 104 in the sidewall 102$w$. The threaded bolt 103 of the tension member 108 secured with a nut 105, thereby further securing the tension member 108 to the rig attachment member 102.

The other end of the cable 106 may be secured to the other sidewall 102$w$ of the same rig attachment member 102 to which the tension member 108 is secured. In some embodiments, the other end of the cable 106 may be coupled to a second tension member 108 which would be secured to the same rig attachment member 102 as the first tension member 108. When the rigging assembly 100 comprises two tension members 108, each tension member 108 has one end coupled to opposite ends of a cable 106 and the other end of each tension member 108 secured to the same rig attachment member 102. The use of a single point connection (i.e., the same rig attachment member 102) can help provide for faster and easier installation of the rigging assembly 100 by a technician.

The cable 106 may be secured to the tension member 108 and sidewall 102$w$ through known methods in the art. For example, in some embodiments, the cable 106 may be secured to the tension member 108 and/or sidewall 102$w$ by open thimbles 112 and cable clips 110 (see, e.g., FIGS. 5 and 6).

Figure 3:
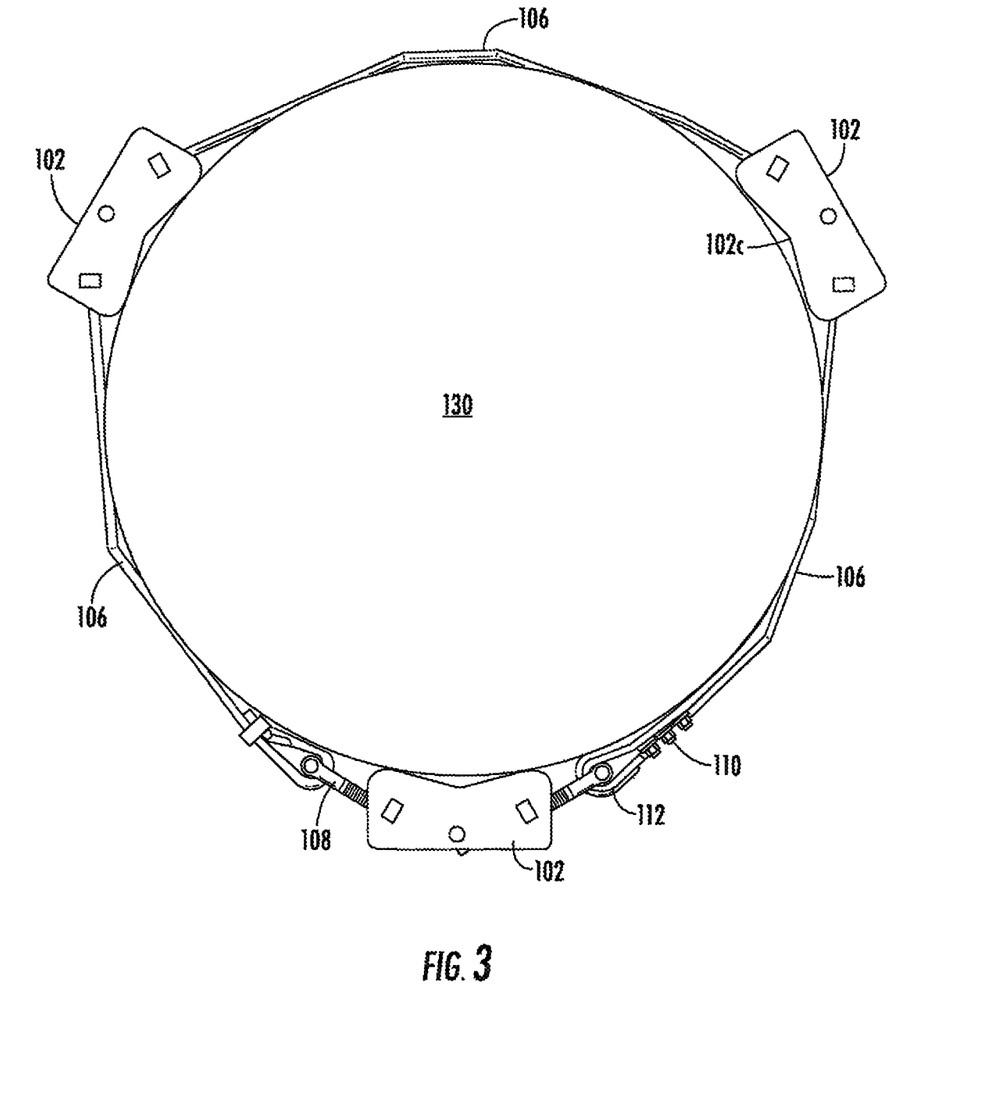
FIG. 3 is a top view of the rigging assembly of FIG. 1.

Still referring to FIGS. 1-4, in some embodiments, the rigging assembly 100 may be used in combination with a mounting structure 130. As shown in FIGS. 3 and 4, the plurality of rig attachment members 102 are equally spaced apart around the mounting structure 130 with the cable 106 serially inserted through each aperture 104 of the rig attachment members 102. As tension (T) is exerted on the cable 106 by the tension member 108 (e.g., rotating the turnbuckle jaw), the rig attachment members 102 are pulled inwardly toward the mounting structure 130. The resultant tension (T) of the cable 106 (in combination with surface friction between the rig attachment members 102 and the mounting structure 130) secures the rig attachment members 102 of the rigging assembly 100 against the mounting structure 130. Note that other methods of exerting tension (T) on the rig attachment members 102 may be used, such as, for example, using a ratchet tie-down strap.

In some embodiments, an inner side 102$c$ of the top 102$t$ and/or bottom 102$b$ of the rig attachment member 102 may be concave in shape. The concave sides 102$c$ provide a larger contact area (i.e., more surface friction) between the rig attachment member 102 and the mounting structure 130, such as, for example, when the mounting structure 130 is cylindrical in shape (e.g., a monopole antenna). In some embodiments, the sidewalls 102w may each be angled outwardly relative to both the top 102t and bottom 102b of the rig attachment member 102 (see, e.g., FIG. 1). Angling the sidewalls 102w outwardly allows for a greater tension (T) to be exerted on the cable 106 and at the same time reduces the stress placed on the tension member 108 and sidewalls 102w. In some embodiments, the sidewalls 102w may each be angled outwardly at an angle (α) of about 0 degrees to about 45 degrees.

Figure 9:
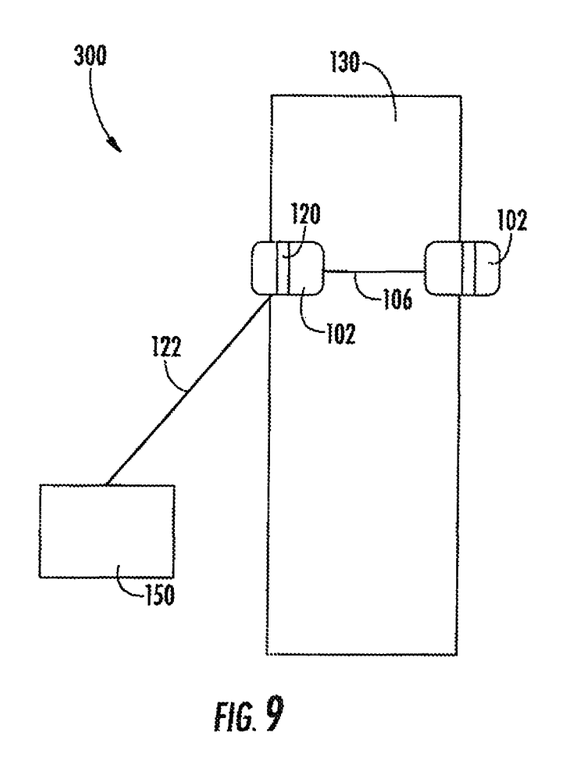
FIG. 9 illustrates an exemplary use of the rigging assembly of FIG. 1 according to embodiments of the present invention.
Figure 10:
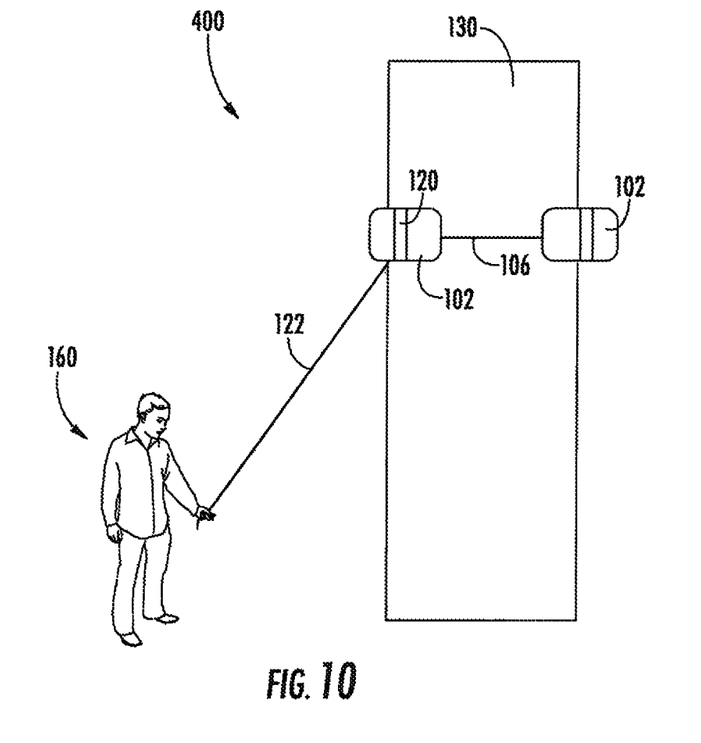
FIG. 10 illustrates an exemplary use of the rigging assembly of FIG. 1 according to embodiments of the present invention.

As discussed in further detail below, once the rigging assembly 100 is secured against the mounting structure 130, the rigging assembly 100 can be used for a variety of tasks or safety precautions, such as, for example, a rigging system 200 for stabilizing mounts/mount reinforcement (FIG. 8), a rigging system 300 for equipment (FIG. 9), or a fall protection system 400 for man positioning (FIG. 10). In some embodiments, the rigging assembly 100 is configured to support a load having a weight of about 1 pound to about 3600 pounds.

In some embodiments, the top 102t and bottom 102b of each rig attachment member 102 may be configured to support a rig point member 120. In some embodiments, the rig point member 120 may be configured to receive and secure a support cable 122. In some embodiments, the rig point member 120 has a diameter of about 0.5 inches to about 1.5 inches. In some embodiments, the bottom 102b of one or more of the rig attachment members 102 may comprise at least one aperture 103 (see, e.g., FIG. 7) that may be configured to receive and secure a support cable 122.

Figure 8:
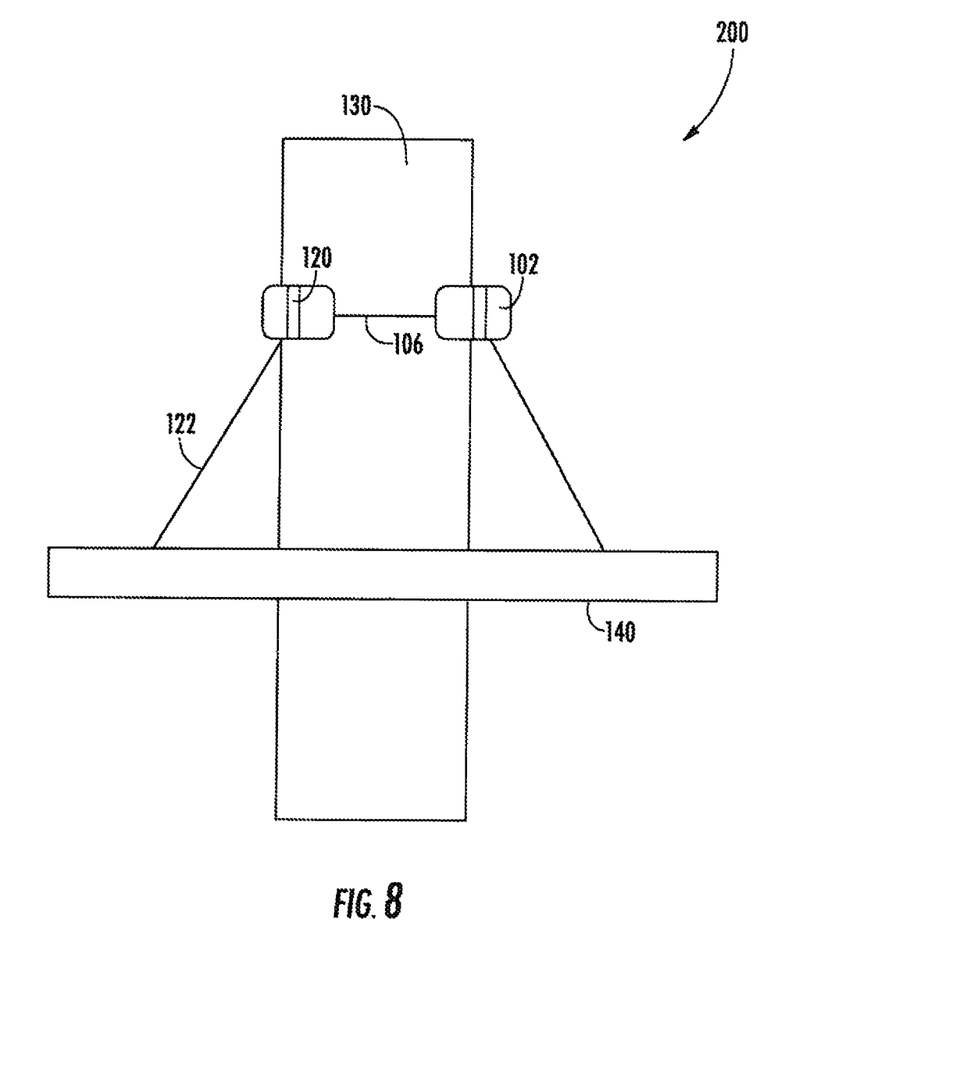
FIG. 8 illustrates an exemplary use of the rigging assembly of FIG. 1 according to embodiments of the present invention.

Referring now to FIGS. 8-10, in some embodiments, the rigging assembly 100 may further comprise a support cable 122 secured to at least one of the rig point members 120. As shown in FIG. 8, the rigging assembly 100 may be used as a rigging system 200 for antenna or radio mounts 140. In some embodiments, the rigging assembly 100 is secured to a mounting structure 130 in the manner discussed above. For example, in some embodiments, the rigging assembly 100 is secured to a monopole antenna. In some embodiments, the rigging assembly 100 is configured to be secured around a mounting structure 130 having a diameter of about 12 inches to about 50 inches.

Still referring to FIG. 8, in some embodiments, the rigging assembly 100 may further comprise a plurality of support cables 122 coupled to an antenna or radio mount 140. Each support cable 122 can be secured to a rig point member 120 of each rig attachment member 102, thereby securing the antenna or radio mount 140 to the mounting structure 130. The support cables 122 may be secured to the rig point members 120 by a variety of ways know in the art. For example, the support cables 122 may be secured to the rig point members 120 by open thimbles 112 and cable clips 110, carabiners or the like.

In some embodiments, the rigging assembly 100 may be used as a rigging system 300 for equipment 150. As shown in FIG. 9, in some embodiments, the rigging assembly 100 is secured to a mounting structure 130 and a support cable 122 is secured to a piece of equipment 150 (e.g., telecommunications equipment). The support cable 122 is also secured to a rig point member 120 of one of the rig attachment members 102, thereby securing the equipment 150 to the mounting structure 130. The support cable 122 is configured to support a load weight of about 1 pound to about 3600 pounds.

Referring to FIG. 10, in some embodiments, the rigging assembly 100 may be used as a fall protection system 400. For example, the rigging assembly 100 may be used as a fall protection system 400 for a person 160 (e.g., a technician) working on a mounting structure 130 (e.g., a telecommunications antenna). Similar to the rigging system 300, the rigging assembly 100 is secured to a mounting structure 130 and a support cable 122 is secured to a person 160 and to a rig point member 120 of one of the rig attachment members 102, thereby securing the person 160 to the mounting structure 130 and providing protection in case of a fall.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A rigging assembly, comprising:
a plurality of rig attachment members, each rig attachment member having a top, a bottom, and at least two side walls, wherein each of the at least two side walls comprise an aperture;
a cable serially inserted through each of the apertures of the rig attachment members; and
at least one tension member having one end coupled to the cable and having an opposite end secured to one of the rig attachment members,
wherein the plurality of rig attachment members is held by the cable in tension exerted by the at least one tension member,
wherein the top and bottom of each rig attachment member are configured to support a rig point member, each rig point member being configured to receive and secure a support cable.

2. The rigging assembly of claim 1, wherein the rigging assembly comprises three rig attachment members.

3. The rigging assembly of claim 1, wherein the at least one tension member is a turnbuckle jaw.

4. The rigging assembly of claim 1, wherein the rigging assembly further comprises a support cable secured to at least one of the rig point members.

5. The rigging assembly of claim 1, wherein the bottom of each rig attachment member comprises at least one aperture configured to support a support cable.

6. The rigging assembly of claim 5, wherein the rigging assembly further comprises the support cable secured through at least one of the apertures.

7. The rigging assembly of claim 1, in combination with a mounting structure, wherein the rigging assembly further comprises a plurality of support cables coupled to an antenna or radio mount, each support cable secured to the rig point member of each rig attachment member.

8. The rigging assembly of claim 7, wherein the mounting structure is a monopole antenna.

9. The rigging assembly of claim 1, wherein the rigging assembly is configured to be secured around a mounting structure having a diameter of about 12 inches to about 50 inches.

10. The rigging assembly of claim 1, wherein the rigging assembly is configured to support a load having a weight of about 1 pound to about 3600 pounds.

11. The rigging assembly of claim 1, wherein each rig attachment member is formed of a weldment.

12. The rigging assembly of claim 1, wherein the plurality of rig attachment members comprise galvanized steel.

13. A rigging system, comprising:
a mounting structure; and
a rigging assembly, the rigging assembly comprising:
- a plurality of rig attachment members surrounding the mounting structure, each rig attachment member having a top, a bottom, and at least two side walls, wherein the top and bottom of each rig attachment member are configured to support a rig point member and each of the at least two side walls comprise an aperture;
- a cable serially inserted through each of the apertures of the rig attachment members; and
- at least one tension member having one end coupled to the cable and having an opposite end secured to one of the rig attachment members, wherein the plurality of rig attachment members is held by the cable in tension exerted by the at least one tension member, thereby securing the rigging assembly to the mounting structure, wherein the mounting structure is a monopole antenna.

14. A fall protection system, comprising:
a mounting structure; and
a rigging assembly, the rigging assembly comprising:
- a plurality of rig attachment members surrounding the mounting structure, each rig attachment member having a top, a bottom, and at least two side walls, wherein the top and bottom of each rig attachment member are configured to support a rig point member and each of the at least two side walls comprise an aperture;
- a cable serially inserted through each of the apertures of the rig attachment members;
- at least one tension member having one end coupled to the cable and having an opposite end secured to one of the rig attachment members;
- a support cable secured to at least one of the rig point members and configured to support a load weight, wherein the plurality of rig attachment members are held by the cable in tension exerted by the at least one tension member, thereby securing the rigging assembly to the mounting structure.

* * * * *